US010909574B2

(12) United States Patent
Atli (10) Patent No.: US 10,909,574 B2
(45) Date of Patent: Feb. 2, 2021

(54) PROMOTING PRODUCTS ON A SOCIAL NETWORKING SYSTEM BASED ON INFORMATION FROM A MERCHANT SITE

(71) Applicant: Manifest Commerce, Inc., San Francisco, CA (US)

(72) Inventor: Selcuk Atli, San Francisco, CA (US)

(73) Assignee: RAKUTEN USA, INC., San Mateo, CA (US)

(*) Notice: Subject to any disclaimer, the term of this patent is extended or adjusted under 35 U.S.C. 154(b) by 404 days.

(21) Appl. No.: 13/951,307

(22) Filed: Jul. 25, 2013

(65) Prior Publication Data

US 2014/0032332 A1    Jan. 30, 2014

Related U.S. Application Data

(60) Provisional application No. 61/675,727, filed on Jul. 25, 2012.

(51) Int. Cl.
*G06Q 30/02* (2012.01)
*G06Q 50/00* (2012.01)

(52) U.S. Cl.
CPC ......... *G06Q 30/0269* (2013.01); *G06Q 50/01* (2013.01)

(58) Field of Classification Search
CPC .... G06Q 30/0269; G06Q 50/01; G06Q 30/02; G06Q 30/0201; G06Q 30/0241; G06Q 30/0245; G06Q 30/0267
USPC ........................................................... 705/2
See application file for complete search history.

(56) References Cited

U.S. PATENT DOCUMENTS

| 8,027,864 | B2 * | 9/2011 | Gilbert | G06Q 10/06375 705/7.31 |
| 8,250,145 | B2 * | 8/2012 | Zuckerberg | G06Q 30/02 705/80 |
| 8,311,888 | B2 * | 11/2012 | Ramer | G06F 17/30905 705/14.64 |
| 8,407,105 | B2 * | 3/2013 | Linden | G06Q 30/02 705/14.53 |
| 2005/0216300 | A1 * | 9/2005 | Appelman | G06Q 10/10 705/319 |
| 2006/0107217 | A1 * | 5/2006 | Lu | G06F 17/30861 715/733 |
| 2007/0073593 | A1 * | 3/2007 | Perry | G06Q 30/02 705/26.64 |
| 2007/0073599 | A1 * | 3/2007 | Perry | G06Q 30/02 705/26.5 |

(Continued)

*Primary Examiner* — Hiep V Nguyen
(74) *Attorney, Agent, or Firm* — Troutman Pepper Hamilton Sanders LLP (57) ABSTRACT

To promote a merchant's products on a social networking system, a promotion engine receives data from a merchant site regarding the merchant site's users' activities. The users' purchases of a promoted product are correlated with the user's activities performed in connection with a related product. An automated process running on a computer system then determines promotion criteria for the promoted product, based at least in part on the activities performed in connection with the related product. A promotion for the promoted product is generated and communicated to a social networking system, which displays the promotion to one or more users of the social networking system based on the determined promotion criteria.

17 Claims, 4 Drawing Sheets

(56) References Cited

U.S. PATENT DOCUMENTS

| | | | |
|---|---|---|---|
| 2007/0150603 A1* | 6/2007 | Crull | G06F 17/3089 709/227 |
| 2008/0033781 A1* | 2/2008 | Peretti | G06Q 30/02 705/14.72 |
| 2009/0070228 A1* | 3/2009 | Ronen | G06Q 30/0601 705/26.1 |
| 2010/0030578 A1* | 2/2010 | Siddique | G06Q 10/0637 705/3 |
| 2010/0094729 A1* | 4/2010 | Gray | G06Q 30/06 705/26.1 |
| 2010/0114739 A1* | 5/2010 | Johnston | G06Q 30/0601 705/26.1 |
| 2010/0132049 A1* | 5/2010 | Vernal | G06F 21/6245 726/27 |
| 2010/0174623 A1* | 7/2010 | McPhie | G06Q 30/00 705/26.1 |
| 2010/0199089 A1* | 8/2010 | Vysogorets | G06F 21/34 713/168 |
| 2011/0106597 A1* | 5/2011 | Ferdman | G06Q 30/02 705/14.11 |
| 2011/0153377 A1* | 6/2011 | Novikov | G06Q 10/063 705/7.11 |
| 2012/0110640 A1* | 5/2012 | Donelson | H04L 63/102 726/3 |

* cited by examiner

PROMOTING PRODUCTS ON A SOCIAL NETWORKING SYSTEM BASED ON INFORMATION FROM A MERCHANT SITE

CROSS REFERENCE TO RELATED APPLICATIONS

This application claims the benefit of U.S. Provisional Application No. 61/675,727, filed Jul. 25, 2012, which is incorporated by reference in its entirety.

BACKGROUND

The disclosure generally relates to promoting products on a merchant site to users of a social networking or other online service, in particular to promoting the products based on the merchant site's users' consumption patterns and actions of users within a social networking system.

Online sites touch various facets of an online user's experience, including the user's social life (through social networking sites and tools) and shopping experience (through various online merchant sites). But these different online sites act like silos for the user's shopping information and the user's social information, with limited mechanisms for data sharing between them. This limited data sharing hinders a more informed shopping experience that is beneficial to the user, the social networking system, and the online merchant. And in some cases, sharing can be undesirable. For example, although social networking systems have some capabilities for merchant sites to share their data back to the social networking systems, this sharing may enable competitors of the merchants to use their customer data. Therefore, it would be beneficial to enable merchants to promote their products on social networking sites based on their own data without exposing the data to third parties, such as competitors.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

To promote a merchant's products on a social networking system, embodiments of the invention include a promotion engine that receives data from a merchant site regarding the merchant site's users' shopping experience. This data may include the users' viewing and purchasing history on the merchant site, shopping cart activity, and even the search engine queries the lead the users to the merchant site. Using insights from this obtained information, the promotion engine determines a product to promote and a "seed" promotion criteria for promoting the product. In one scenario, embodiments of the invention provide easier or relatively cheap access to data on the merchant site as compared to the social networking system. Accordingly, the embodiments analyze information retrieved from the merchant's site to determine products to be promoted and promotion criterion for targeting users for the promoted product.

The promotion criteria may comprise a user activity on another product (e.g., having added another product to the user's shopping cart), demographic information about the user, and/or social information about the user obtained from a social networking system. The promotion engine then uses the determined promoted product and promotion criteria to promote the product on a social networking site. The promotion engine may promote the product based on the promotion criteria in many ways, such as by buying advertisements (ads or sponsored stories) for or posting content about the promoted product on the social networking system. Moreover, the promotion criteria are used to determine how to promote the promoted product. For example, the promotion criteria may be used to determine targeting criteria for the advertising or to determine where to post the content (e.g., posting a promotion about the promoted product on a page devoted to a different product associated with the promotion criteria).

In one example implementation of an embodiment of the invention, the promotion engine receives information from a merchant site about the customers of the site. The information includes data in which there is a strong correlation between users who landed on the merchant site using a search term associated with a first product and ultimately purchased a second product. Alternatively, the data may have a strong correlation between users who viewed a page about the first product or who added the first product to their shopping cart but ultimately purchased the second product. The promotion engine thus determines that the first product can be used for promotion criteria to promote the second product (i.e., the promoted product). Then, on behalf of the merchant site, the promotion engine promotes the second product on a social networking system in a way that targets users who have expressed an interest in the first product. For example, the promotion engine may post a coupon for the second product to a page associated with the first product or may buy an ad for the second product and target the ad to users who have expressed an interest in (or "liked") that page associated with the first product. In this way, embodiments of the invention can leverage the insights gleamed from users' activities on a merchant site to promote the merchant's products on a social networking site, without having to share the data that lead to these insights. Since this is done automatically without requiring involvement by the merchant sites, the promotion method is scalable and need not rely on human intuition or involvement.

Figure 1:
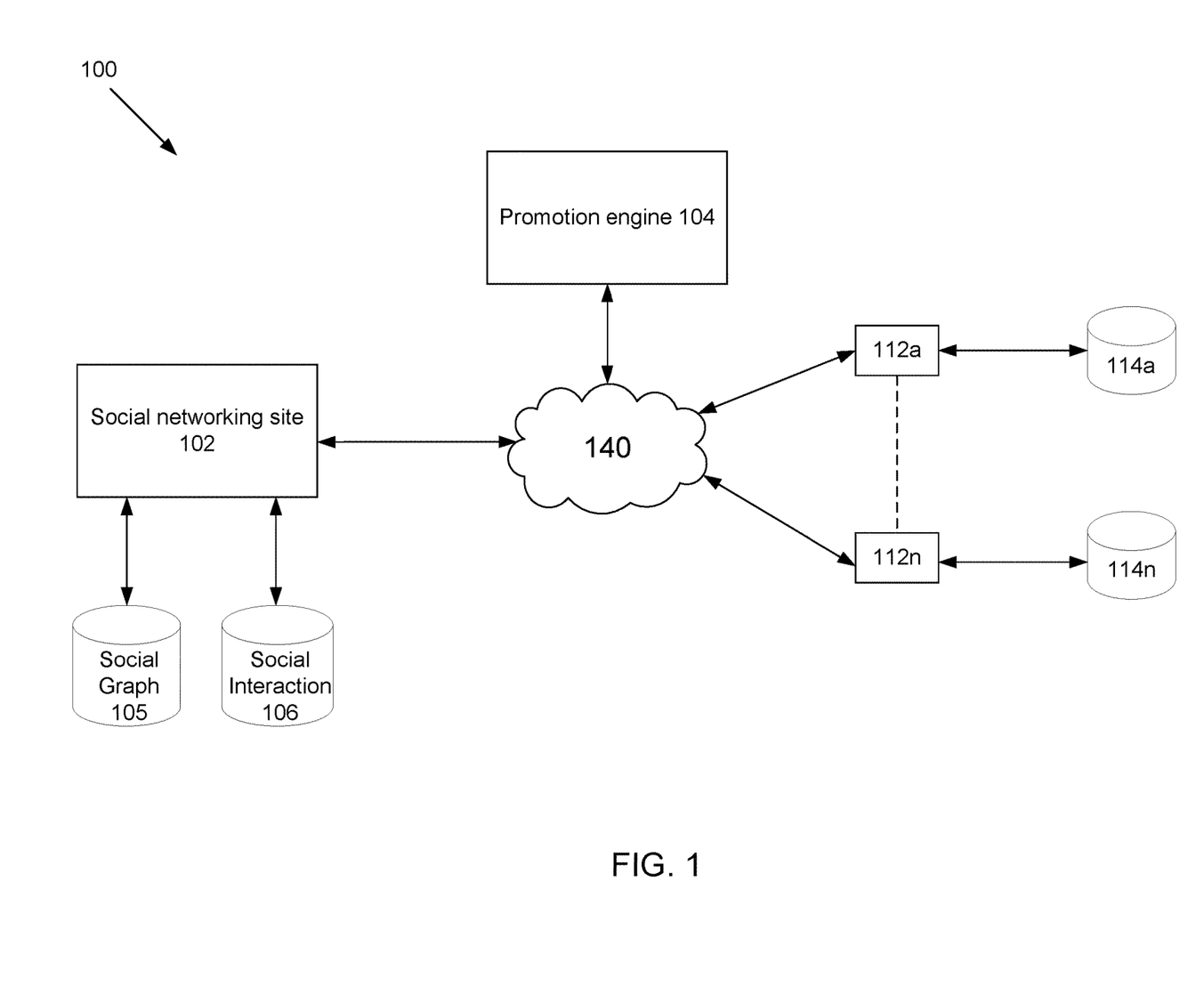
FIG. 1 illustrates a system that provides recommendations or promotions for users based on the users' consumption data and optionally social data, in accordance with an embodiment of the invention.

FIG. 1 illustrates a system 100 that provides recommendations or promotions for users based on the users' consumption data and optionally social data. The system 100 includes a social networking site 102, a promotion engine 104, merchant sites 112a-n (collectively referred to as "merchant site 112"), and a network 140. Additional social networking sites and promotion engines may be present in the system 100 and interact with each other in a similar manner as described herein. The network 140 represents the communication pathways between the social networking site 102, the promotion engine 104, and the merchant sites 112*a-n*. In one embodiment, the network 140 is the Internet. The network 140 can also use dedicated or private communication links that are not necessarily part of the Internet.

The social networking site 102 is communicatively coupled to a social graph database 105 and a social interaction database 106. These databases 105, 106 store users' social data indicating the user's friends, interests, preferences, groups, etc. The social graph database 105 stores a social graph that includes information indicating a user's relationship with other entities in the community, such as users, merchants, and other entities represented by a web page. The social interaction database 106 stores data indicating a user's and the user's friends' interactions with other entities in the social network community. For example, the database 106 may store comments from the user regarding another entity or information indicating a user's preference for another entity (e.g., like, love, favorite, dislike). The social networking site 102 collects data regarding various users as they interact on the site 102 and populate the databases 105, 106 with the collected information.

The merchant sites 112*a-n* (collectively referred to as "merchant site 112") are communicatively coupled to their corresponding consumption databases 114*a-n* (collectively referred to as "consumption database 114"). The merchant site 112 collects data indicating a user's interaction with the site 112 as the user browses and purchases various products on the site. The merchant site 112 stores the collected data about the user as consumption data in the consumption database 114. Examples of stored consumption data include clickstream data indicating a user's interaction with various parts of the merchant site (e.g., viewing, selecting or clicking a particular part of the page displaying a particular product); shopping cart data indicating the user's interaction with a shopping cart (e.g., adding to, removing from, or buying products placed within a shopping cart); purchasing data indicating purchases a user has made; and search data indicating the searches the user has performed on the merchant site and incoming search terms that led a user to the merchant site 112. Additionally, the merchant site 112 receives, from the users or an external source, and stores the users' demographic information, such as the users' sex, age group, income level, and place of residence.

The promotion engine 104 promotes products for the merchant site 112 to users on the social networking site 102 (and optionally on the merchant site 112) based on the products' information, the users' consumption data, and optionally based on the users' social data. The promotion engine 104 receives from the merchant site 112 information identifying products sold by the merchant site 112 and consumption data for users of the merchant site 112. For consumption data, the promotion engine 104 retrieves consumption data through the merchant site 112 or the site's consumption database 114. The consumption data may be retrieved by the promotion engine through application programming interfaces provided by the merchant site 112 or through JavaScript on the merchant site that captures and transmits the consumption data to the promotion engine 104 as the user browses the merchant site.

For information regarding the products, the promotion engine 104 retrieves information identifying sold products through the merchant site 112 or a database that stores catalogs including identifying information about the sold products. In one embodiment, the merchant site 112 stores attributes associated with these sold products in the consumption database 114. These attributes may have been specified by the merchants, buyers or reviewer of the products. In another embodiment, the promotion engine 104 queries the social networking site 102 or another graph network that includes the products as nodes and stores attributes associated with the nodes. The products' attributes may be stored, updated and retrieved from the social networking site 102 by the merchant site 112 (or another user) through a protocol like the Open Graph protocol. Responsive to the query from the promotion engine 104, the promotion engine 104 receives the products' attributes from the social networking site 102 or another graph network.

Based on the received consumption data and products' information, the promotion engine 104 determines a promoted product, a criterion for promoting the product on the social networking site 102, and optionally a promotion associated with the promoted product. For example, the promotion engine 104 analyzes the consumption data and determines that sales of a particular product are trending and therefore identifies the trending product as the promoted product. Additionally, the analysis may indicate that people who bought a first product also bought the promoted product. In one embodiment, the promotion engine 104 receives feedback from the merchant site 112 and/or the social networking site 102 indicating the effectiveness of a previous promotion for a promoted product. For example, the feedback may indicate that a previous promotion had a high success rate (i.e. the promotion led to the targeted users buying the promoted product) amongst users with a particular trait.

Based on this feedback or analysis of the consumption data, the promotion engine 104 determines a promoted product and a promotion criterion. For example, the promotion engine 104 may recalibrate the promotion criterion for a previously promoted product to target users who have the same or similar characteristics as users who bought the promoted product in response to the received promotion. The promotion engine may also determine as a promotion criterion users on the social networking site 102 who have indicated a preference for the first product should be targeted to receive promotions for the promoted product. The consumption data may also indicate that users who searched for a first product also interacted with information about the promoted product. The promotion engine 104 may therefore determine as promotion criterion users on the social networking site 102 who have interacted with/searched for/indicated preference for the first product should be targeted to receive promotions for the promoted product. Alternatively, the promotion engine 104 may determine as promotion criterion users who have indicated a preference for products with an attribute associated with the promoted product, to receive promotion for the promoted product. Additional examples of promotion criteria based on analysis of consumption data may include users who have the same demographic information (like users' sex, age group, income level or place of residence) as the users who bought the first product and the promoted product. Another example promotion criterion includes users who have particular characteristics that are the same as characteristics of users who bought the promoted product.

The promotion engine 104 may also account for currently trending topics in blogs or the social networking site 102 for determining a promoted product. The promotion engine 104 may determine a trending topic on the social networking site 102, determine products with attributes associated with the trending topic as promoted products, and determine the promotion criteria as users with attributes associated with the trending topic. For example, if the trending topic is a particular brand of shoes, the promotion engine 104 may determine the brand's products as promoted products and determine the promotion criterion as users who have liked or indicated their preference for that brand on the social networking site 102 or the merchant site. The promotion engine 104 may also account for current events or special occasions for determining a promoted product. For example, the promotion engine 104 may select roses as a promoted product once the current date is within four weeks of the Valentine's Day.

In one embodiment, the promotion engine 104 identifies the promoted product and the promotion criteria by analyzing the consumption data, demographic data, and/or other data from external sources associated with these users. Any of a variety of data analysis techniques may be used, such as machine learning techniques, regression analysis, and collaborative filtering. The analysis results in a combination of a promoted product and promotion criteria that predict a user's intent or likelihood of purchasing the promoted product.

In one embodiment, the promotion engine 104 determines a promotion criterion that accounts for preferences for various products within the user's social circle (i.e., the promotion criterion accounts for the user's social data). Examples of such criterion include users belonging to groups associated with the promoted product or the first product, users whose friends are interested in the promoted product or the first product, users whose friends have indicated their preference for the promoted product or the first product, users that belong to a particular group (based on user's school, work, hobbies, residence, etc.) where the promoted product or the first product is popular.

Figure 2A:
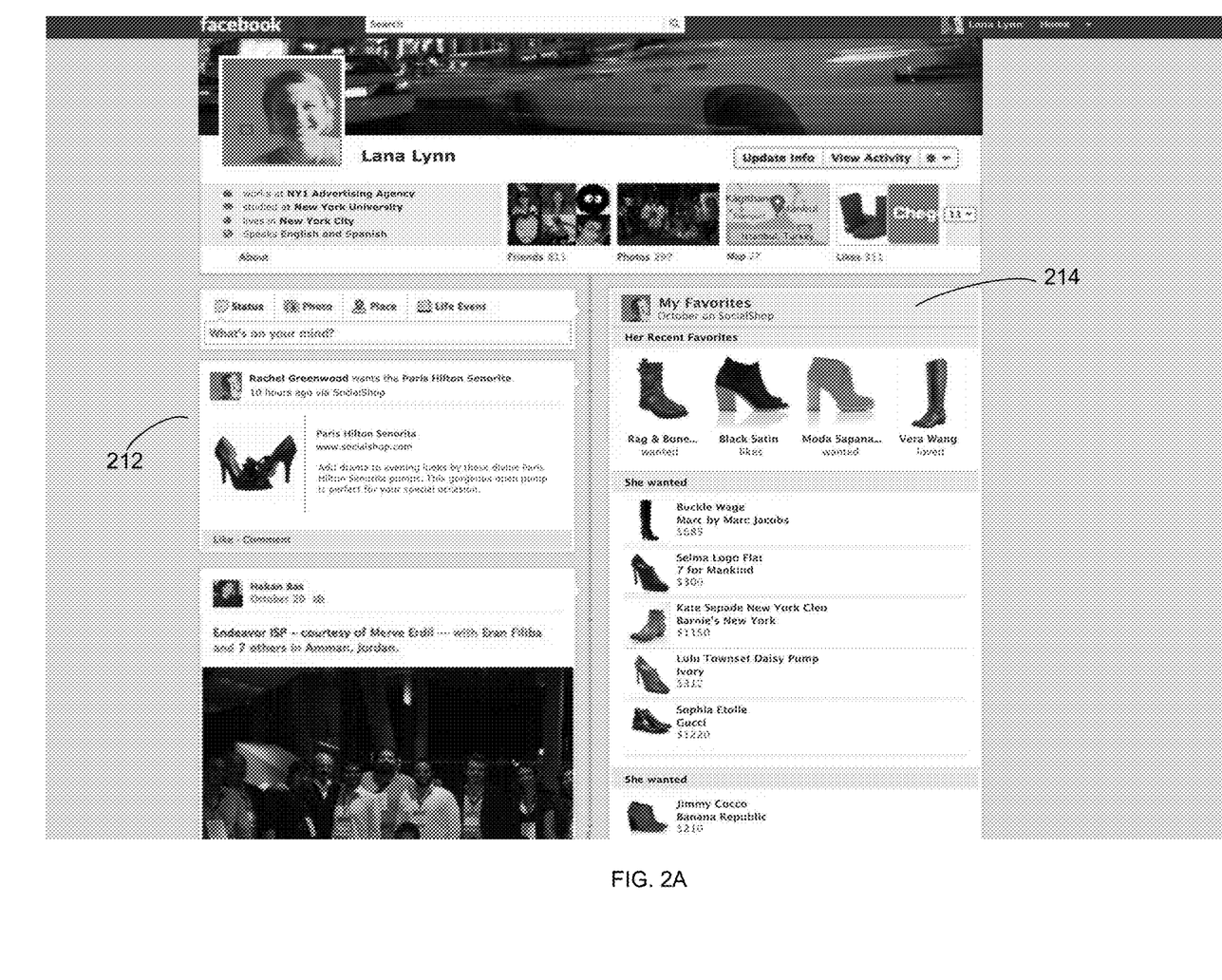
FIG. 2A illustrates an update presented on a user's social profile in response to the user indicating their preference for the promoted product, in accordance with an embodiment of the invention.

After determining the promoted product and the promotion criteria, the promotion engine 104 promotes the product on the social networking site 102 and optionally on the merchant site 112. The promotion engine 104 promotes the product on the social networking site 112 by, e.g., posting messages including promotional content or buying advertisements on the social networking site 112. To promote the product through message posts, the promotion engine 104 posts messages including promotional content on the promoted product's page, the merchant site's page, or pages of products related to the promoted product on the social networking site 112. The posted messages on any of these pages may be displayed as newsfeed stories or other message updates on pages of users that subscribe to or are connected to these pages. promotion engine Additionally, information about the promoted product may be displayed as updates on the users' and the users' friends' pages when the users comment about the promoted product or indicate their preference (e.g., like, love, favorite, dislike) for the promoted product. FIG. 2A illustrates an update presented on a user's social profile in response to the user indicating their preference for the promoted product. The illustrated updates are presented as a timeline 214 of promoted products that have been liked by the user, wherein the user's most recent likes are presented at the top and the user's earlier favorites are presented in a descending chronological order. Moreover, the updates are displayed to the user and the user's friends on their news feed. A news feed is a feed of information displaying various updates related to the user's friends. An example of such a promotion is the news feed update 212 that indicates the user's friend's preference for a particular brand of shoes.

To promote the product through advertisement, the promotion engine 104 transmits an advertisement for the promoted product and targeting criteria for the advertisement (determined based on the promotion criteria) to the social networking site 102. In one embodiment, the promotion engine 104 analyzes the product information for the promoted product retrieved from the merchant site 112 and determines promotional content for the promoted product. For e.g., the product information may indicate a promotional price (e.g. a discounted price) or desirable features of the promoted product. The promotion engine 104 analyzes the product information to retrieve this information, create promotional content, and transmit the promotional content to the social networking site 102. In another embodiment, the social networking site 102 queries and retrieves the promotional content from the merchant site 112 based on the received identification for the promoted product.

In yet another embodiment, the promotion engine 104 determines promotional content based on the promotion criterion and the promoted product. The promotion engine 104 may have promotional content with static language and place holders for dynamic content that may be populated based on the promotion criterion and the promoted product. For example, the promotion content may be "Like [promotion criterion], then try [promoted product]," wherein "[promotion criterion]" and "[promoted product]" are dynamic content. If the promoted product is MOTOROLA RAZR Phone and the promotion criterion is users who like MOTOROLA smartphones, the promotion engine 104 may determine the promotion content to be "Like Motorola smartphones, then try MOTOROLA RAZR phone." The promotion engine 104 may also determine if an image associated with the MOTOROLA RAZR phone is available as the phone's attributes in consumption database 114 or on a graph network. The promotion engine 104 may then retrieve the associated image and include the retrieved image with the textual content as promotion content. After determining the promotion content, the promotion engine 104 transmits the promotion content and promotion criterion to the social networking site 102. The social networking site 102 then displays the promotions on pages of the users that meet the targeting criteria.

Figure 2B:
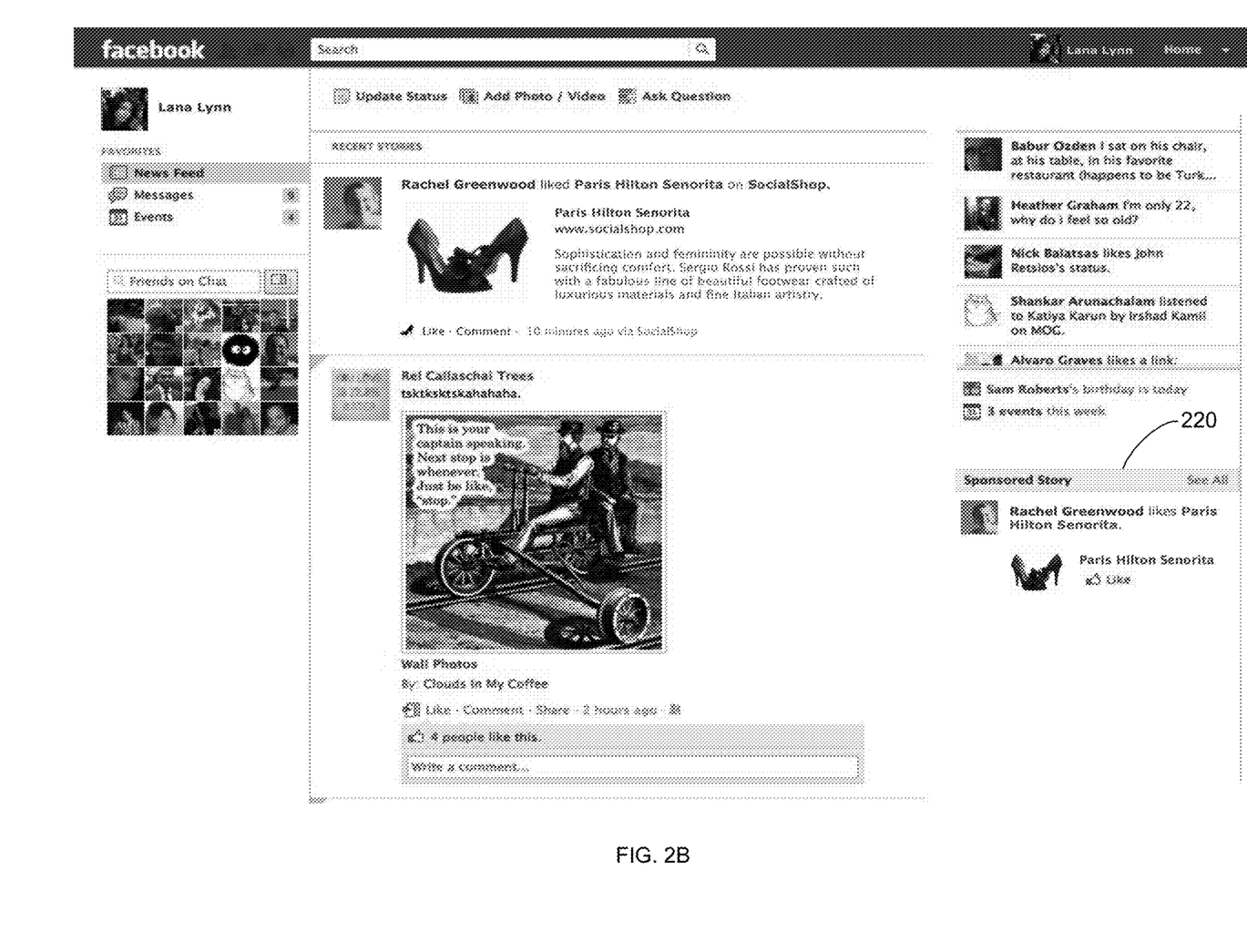
FIG. 2B illustrates a promotion being displayed as a sponsored story, in accordance with an embodiment of the invention.

The promotions for a product may be presented to the users as a sponsored story, a sponsored ad, or in another format in connection with their profiles. FIG. 2B illustrates the promotion being displayed as a sponsored story 220. A sponsored story is an update that is eligible to appear as a news feed update on the user's social page. Unlike the news feed update, however, the sponsored story is shown distinctly on the user's social page in response to a promotion paid for by a vendor of the promoted product or service. Again, in one embodiment, the promotion criterion for a promoted product may be based on the targeted users' demographics. Accordingly, a sponsored story may be targeted only to a segment of users that are part of a desired demographic. For example, if a promoted product is a pair of jeans popular amongst females of ages between 20-25 years, the sponsored story for the pair of jeans is only displayed to the users who fit in this desired demographic (females of ages between 20-25 years).

Figure 2C:
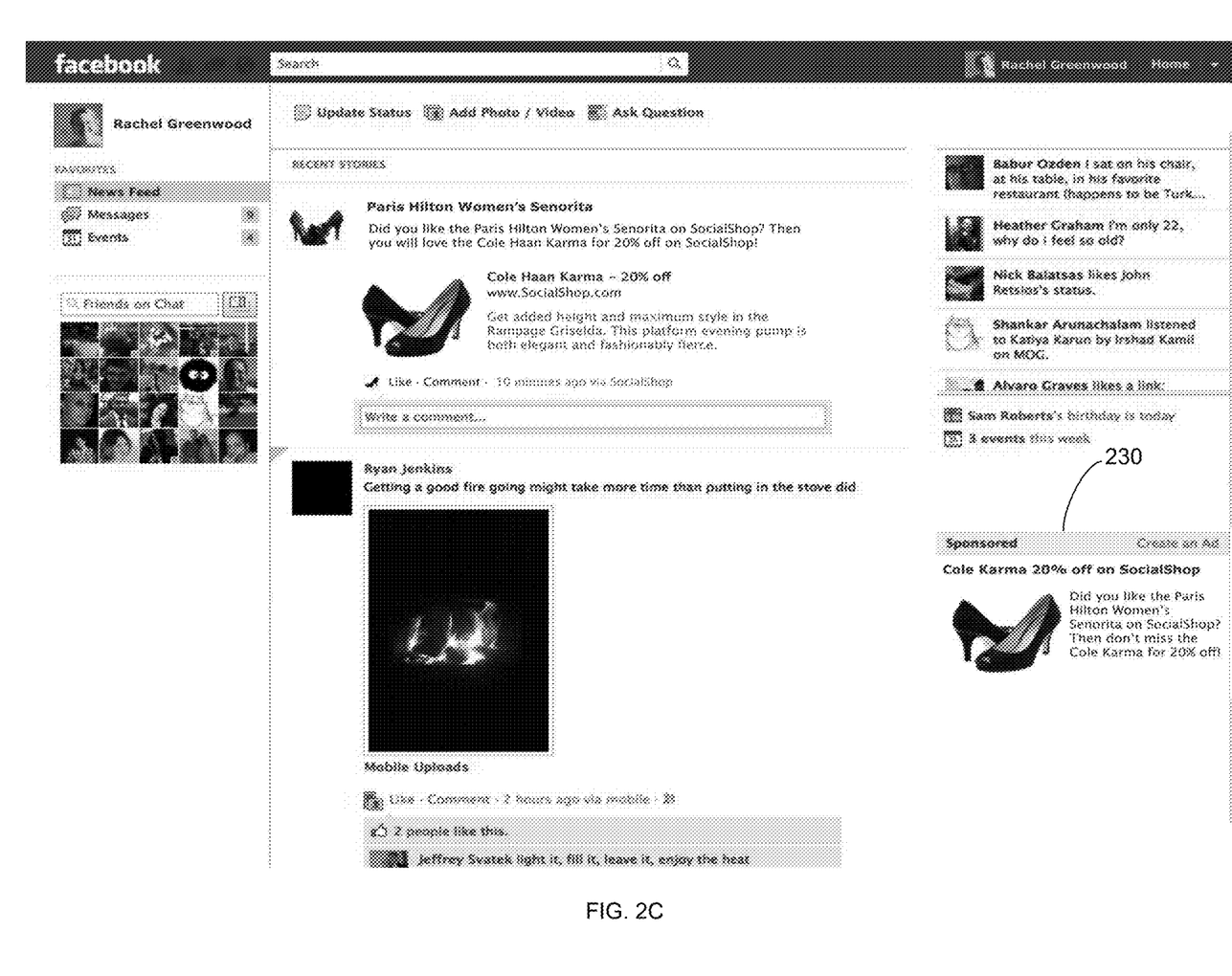
FIG. 2C illustrates a promotion being displayed as a sponsored ad, in accordance with an embodiment of the invention.

FIG. 2C illustrates a promotion being displayed as a sponsored ad 230. Like sponsored stories, these ad are shown distinctly on the user's page in response to a promotion created/requested/bought by a vendor of the promoted product or service. However, unlike the sponsored stories and news feed updates, these ads may not be related to the user's friends, i.e. the user's friends may not have indicated any preference for the product promoted in the ad.

In this manner, the promotion engine 104 beneficially assists the merchant site 112 in analyzing their consumption data and promoting their products on the social networking site 102.

In one embodiment, in addition to promoting products on the social networking site 102, the promotion engine 104 also promotes the products on the merchant site 112 through plug-ins provided by the promotion engine 104. The plug-ins may comprise HTML code that causes the merchant site 112 to insert an iframe in which the promotion engine 104 can provide content. In this inserted iframe, in one embodiment, the promotion engine 104 displays content for promoted products to users that satisfy the promotion criteria for the products. The inserted frame or the controlled part also tracks and stores consumption data for users that browse through the displayed content for the promoted products. The stored consumption data is transmitted to the promotion engine 104 to update or add to the consumption data already available to the promotion engine 104.

An example of such a plug-in promotes products to users based on their social circles—i.e., user's social groups or circles at work, school, based on the user's interest or demographic information. For this plug-in, the users provide to the plug-in (or the merchant site 112) their authentication information used on the social networking site 102, and the authentication information is transmitted to the promotion engine 104. The promotion engine 104 uses the identification information to associate the users' social networking identity with their consumption data, and query the social networking site 102 to identify a user's social circles on the social networking site 102 and the users that belong to the social circles (hereinafter "circle users").

The promotion engine 104 analyzes the consumption data for the user's social groups to determine if the users in those social groups have bought or indicated interest in the promoted product or a related product. Based on this analysis, the promotion engine 104 promotes products to the user that are popular, bought, or preferred amongst the circle users. In one embodiment, the promotion engine 104 displays in the circles frame the promoted product and information indicating the circle users that prefer or bought the product.

In this manner, the promotion engine 104 beneficially leverages a user's social data to promote appropriate products to the user through the circles plug-in. Because a user's buying habits are partly affected by the preference/taste of the user's social circle, the promotion engine 104 beneficially assists the merchant site 112 in promoting products for the user based on their social circle.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method implemented by a promotion engine for promoting a product, the promotion engine being in communication with a social networking site and a plurality of merchant sites via a network, the method comprising:

providing remote access to users over the network so any one of the users can receive product promotion in real time at each merchant site and the social networking site so that each user has immediate access to the product promotion;

outputting, by a processor of the promotion engine, a plug-in to each merchant site to display a frame on the merchant site, the plug-in including HTML code, the frame displaying promotion content provided by the processor of the promotion engine, the frame tracking and storing consumption data for users that browse the displayed promotion content;

displaying, in the frame on the merchant site, a field for a first user to enter the first user's authentication information used on the social networking site, the first user's authentication information being used to authenticate the first user at the social networking site;

receiving, by the processor of the promotion engine, from the frame on the merchant site, the first user's authentication information used on the social networking site;

sending, by the processor of the promotion engine, a request to the social networking site, the request requesting the social networking site to retrieve information about at least one social group that the first user belongs to on the social networking site, the request requesting the social networking site to transmit the retrieved information to the processor of the promotion engine, the request including the first user's authentication information used on the social networking site;

receiving, by the processor of the promotion engine, from the social networking site, the retrieved information about the at least one social group that the first user belongs to on the social networking site, wherein the social networking site retrieves the information about the at least one social group of the first user from a social graph database and a social interaction database that are communicatively coupled to the social networking site, wherein the social graph database stores a social graph including information indicating the at least one social group that the first user belongs to, each social group including one or more users other than the first user, wherein the social interaction database stores data indicating product preferences of each user within each social group, the retrieved information about the one or more social groups including the product preferences of the users within the at least one social group of the first user; receiving, by the processor of the promotion engine, from the merchant site, information identifying products offered by the merchant site;

retrieving, by the processor of the promotion engine, through an application programming interface, from the merchant site, all consumption data of all users on the merchant site;

selecting, by the processor of the promotion engine, from the retrieved consumption data on the merchant site, consumption data of the users of the at least one social group that the first user belongs to, wherein the processor of the promotion engine associates social networking identity of the users of the at least one social group that the first user belongs to with the consumption data of the users of the at least one social group that the first user belongs to;

determining, by the processor of the promotion engine, products for promotion offered by the merchant site based on the selected consumption data and the product preferences of the users within the at least one social group that the first user belongs to;

analyzing, by the processor of the promotion engine, the consumption data to identify a trending product and a first product, wherein the first product is comparable to the products for promotion;

receiving, by the promotion engine and from at least one of the merchant site or the social networking site, data indicating a high effectiveness of a previous promotion of the first product;

selecting, by the processor of the promotion engine, at least one product for promotion from amongst the products for promotion based on at least one of the consumption data, the at least one product for promotion being comparable to the trending product, or the data indicating high effectiveness of the previous promotion of the first product;

sending, by the processor of the promotion engine, in real time, to the frame on the merchant site for display to the first user, promotion information about the at least one product selected for promotion;

sending, by the processor of the promotion engine, in real time, to the frame on the merchant site for display to the first user, information indicating the selected consumption data;

sending, by the processor of the promotion engine, in real time, to the social networking site, to display the promotion information on the first user's social profile, the first user's social profile displaying a plurality of message updates received from the processor of the promotion engine in a timeline, each message update indicating a promoted product liked by the first user, the first user's most recent like being presented at the top of the timeline, and the first user's earlier likes being presented in a descending chronological order;

receiving, by the processor of the promotion engine, from the frame on the merchant site, the first user's consumption data as the first user browses the promotion information; and updating the consumption data of the merchant site based on the first user's consumption data.

2. The method of claim 1, further comprising:
receiving, from each merchant site, data describing activities of one or more users at the merchant site, the activities performed in connection with a plurality of products on the merchant site; and
correlating one or more of the activities on the merchant site performed in connection with a related product with one or more purchases of a promoted product,
wherein the correlated activities performed in connection with the related product comprise an activity selected from a group consisting of: viewing a product page for the related product, purchasing the related product, and landing on the merchant site from an inbound search engine using a search query associated with the related product.

3. The method of claim 2, further comprising:
determining one or more promotion criteria for the promoted product, the promotion criteria based at least in part on the related product,
wherein determining the promotion criteria comprises identifying characteristics of a group of users who are similar to users who purchased the promoted product.

4. The method of claim 3, wherein the identifying uses collaborative filtering.

5. The method of claim 3, wherein the promotion criteria comprise a correlated activity performed in connection with the related product.

6. The method of claim 3, further comprising purchasing an advertisement containing the promotion and having the determined promotion criteria.

7. The method of claim 3, further comprising purchasing a sponsored story containing the promotion and having the determined promotion criteria.

8. The method of claim 1, further comprising posting the products for promotion on a page hosted by the social networking site.

9. A system for promoting a product, comprising:
a promotion engine in communication with a social networking site and a plurality of merchant sites via a network, including a processor configured to:
provide remote access to users over the network so any one of the users can receive product promotion in real time at each merchant site and the social networking site so that each user has immediate access to the product promotion;
send a plug-in to each merchant site to display a frame on the merchant site, the plug-in including HTML code, the frame displaying promotion content provided by the processor of the promotion engine, the frame tracking and storing consumption data for users that browse the displayed promotion content;

display, in the frame on the merchant site, a field for a first user to enter the first user's authentication information used on the social networking site, the first user's authentication information being used to authenticate the first user at the social networking site;

receive, from the frame on the merchant site, the first user's authentication information used on the social networking site;

send a request to the social networking site, the request requesting the social networking site to retrieve information about at least one social group that the first user belongs to on the social networking site, the request requesting the social networking site to transmit the retrieved information to the processor of the promotion engine, the request including the first user's authentication information used on the social networking site;

receive, from the social networking site, the retrieved information about the at least one social group that the first user belongs to on the social networking site, wherein the social networking site retrieves the information about the at least one social group of the first user from a social graph database and a social interaction database that are communicatively coupled to the social networking site, wherein the social graph database stores a social graph including information indicating the at least one social group that the first user belongs to, each social group including one or more users other than the first user, wherein the social interaction database stores data indicating product preferences of each user within each social group, the retrieved information about the one or more social groups including the product preferences of the users within the at least one social group of the first user;

receive, from the merchant site, information identifying products offered by the merchant site;

retrieve, through an application programming interface, from the merchant site, all consumption data of all users on the merchant site;

select, from the retrieved consumption data on the merchant site, consumption data of the users of the at least one social group that the first user belongs to, wherein the processor of the promotion engine associates social networking identity of the users of the at least one social group that the first user belongs to with the consumption data of the users of the at least one social group that the first user belongs to;

determine products for promotion offered by the merchant site based on the selected consumption data and the product preferences of the users within the at least one social group that the first user belongs to;

analyze the consumption data to identify a trending product and a first product, wherein the first product is comparable to the products for promotion;

receive, from at least one of the merchant site or the social networking site, data indicating an effectiveness of the first product;

select at least one product for promotion from amongst the products for promotion based on at least one of the consumption data, the at least one product for promotion being comparable to the trending product, or the data indicating the effectiveness of the first product being high;

send, in real time, to the frame on the merchant site for display to the first user, promotion information about the at least one product selected for promotion;

send, in real time, to the frame on the merchant site for display to the first user, information indicating the selected consumption data;

send, in real time, to the social networking site, to display the promotion information on the first user's social profile, the first user's social profile displaying a plurality of message updates received from the processor of the promotion engine in a timeline, each message update indicating a promoted product liked by the first user, the first user's most recent like being presented at the top of the timeline, and the first user's earlier likes being presented in a descending chronological order;

receive, from the frame on the merchant site, the first user's consumption data as the first user browses the promotion information; and update the consumption data of the merchant site based on the first user's consumption data.

10. The system of claim 9, wherein the processor of the promotion engine is configured to:

receive, from each merchant site, data describing activities of one or more users at the merchant site, the activities performed in connection with a plurality of products on the merchant site; and correlate one or more of the activities on the merchant site performed in connection with a related product with one or more purchases of a promoted product;

wherein the correlated activities performed in connection with the related product comprise an activity selected from a group consisting of: viewing a product page for the related product, purchasing the related product, and landing on the merchant site from an inbound search engine using a search query associated with the related product.

11. The system of claim 10, wherein the processor of the promotion engine is configured to:

determine one or more promotion criteria for the promoted product, the promotion criteria based at least in part on the related product;

wherein determining the promotion criteria comprises identifying characteristics of a group of users who are similar to users who purchased the promoted product.

12. The system of claim 11, wherein the identifying uses collaborative filtering.

13. The system of claim 11, wherein the promotion criteria comprise a correlated activity performed in connection with the related product.

14. The system of claim 11, wherein the processor of the promotion engine is configured to purchase an advertisement containing the promotion and having the determined promotion criteria.

15. The system of claim 11, wherein the processor of the promotion engine is configured to purchase a sponsored story containing the promotion and having the determined promotion criteria.

16. The system of claim 9, wherein the processor of the promotion engine is configured to post the products for promotion on a page hosted by the social networking site.

17. A system for promoting a product, comprising:
a social networking site storing information about contacts within each user's social circle, each user identifiable by the user's authentication information;
a plurality of merchant sites each displaying products and storing consumption data indicative of customers' interactions with the website; and
a promotion engine in communication with the social networking site and the plurality of merchant sites via a network, including a processor configured to:
provide remote access to users over the network so any one of the users can receive product promotion in real time at each merchant site and the social networking site so that each user has immediate access to the product promotion;
send a plug-in to each merchant site to display a frame on the merchant site, the plug-in including HTML code, the frame displaying promotion content provided by the processor of the promotion engine, the frame tracking and storing consumption data for users that browse the displayed promotion content;
display, in the frame on the merchant site, a field for a first user to enter the first user's authentication information used on the social networking site, the first user's authentication information being used to authenticate the first user at the social networking site;
receive, from the frame on the merchant site, the first user's authentication information entered by the first user at the frame on the merchant site;
send a request to the social networking site, the request requesting the social networking site to retrieve information about at least one social group that the first user belongs to on the social networking site, the request requesting the social networking site to transmit the retrieved information to the processor of the promotion engine, the request including the first user's authentication information used on the social networking site;
receive, from the social networking site, the retrieved information about the at least one social group that the first user belongs to on the social networking site, wherein the social networking site retrieves the information about the at least one social group of the first user from a social graph database and a social interaction database that are communicatively coupled to the social networking site, wherein the social graph database stores a social graph including information indicating the at least one social group that the first user belongs to, each social group including one or more users other than the first user, wherein the social interaction database stores data indicating product preferences of each user within each social group, the retrieved information about the one or more social groups including the product preferences of the users within the at least one social group of the first user;
receive, from the merchant site, information identifying products offered by the merchant site;
retrieve, through an application programming interface, from the merchant site, the all consumption data of all users on the merchant site;
select, from the retrieved consumption data on the merchant site, consumption data of the users of the at least one social group that the first user belongs to, wherein the processor of the promotion engine associates social networking identity of the users of the at least one social group that the first user belongs to with the consumption data of the users of the at least one social group that the first user belongs to;
determine products for promotion offered by the merchant site based on the selected consumption data and the product preferences of the users within the at least one social group that the first user belongs to;
analyze the consumption data to identify a trending product and a first product, wherein the first product is comparable to the products for promotion;
receive, from at least one of the merchant site or the social networking site, data indicating an effectiveness of the first product;
select at least one product for promotion from amongst the products for promotion based on at least one of the consumption data, the at least one product for promotion being comparable to the trending product, or the data indicating the effectiveness of the first product being high;
send, in real time, to the frame on the merchant site for display to the first user, promotion information about the at least one product selected for promotion;
send, in real time, to the frame on the merchant site for display to the first user, information indicating the selected consumption data;
send, in real time, to the social networking site, to display the promotion information on the first user's social profile, the first user's social profile displaying a plurality of message updates received from the processor of the promotion engine in a timeline, each message update indicating a promoted product liked by the first user, the first user's most recent like being presented at the top of the timeline, and the first user's earlier likes being presented in a descending chronological order;
receive, from the frame on the merchant site, the first user's consumption data as the first user browses the promotion information; and
update the consumption data of the merchant site based on the first user's consumption data.

\* \* \* \* \*